Feb. 17, 1953

A. N. ALLEN, JR 2,628,687

SPRING LOADED PRELOADING MECHANISM FOR BLADE
RETENTION WITH INCREASED STIFFNESS

Filed Feb. 8, 1950

INVENTOR
ARTHUR N. ALLEN, JR.
BY Harris G. Luther
ATTORNEY

Patented Feb. 17, 1953

2,628,687

UNITED STATES PATENT OFFICE 2,628,687

SPRING LOADED PRELOADING MECHANISM FOR BLADE RETENTION WITH INCREASED STIFFNESS

Arthur N. Allen, Jr., Wethersfield, Conn., assignor to United Aircraft Corporation, East Hartford, Conn., a corporation of Delaware Application February 8, 1950, Serial No. 143,024

8 Claims. (Cl. 170—160.58)

1

This invention relates to variable pitch aircraft propellers and more specifically to improved blade retention means for increasing the effective stiffness of metal propeller blade mountings and the like.

The advent of propeller blades of increased width for high speed and high performance aircraft has increased the requirement for overall stiffness of these blades especially where metal propeller blades are utilized. Experience dictates that the point of least stiffness when considering the propeller vibratory system occurs at the point of blade retention.

It is therefore an object of the invention to provide an improved blade retention means for aircraft propellers wherein the necessary blade retention stiffness characteristics are provided at the hub socket by use of a bearing member, preferably of the roller type, which is positioned outboard of the usual primary blade retaining members.

Another object of this invention is to provide a mechanism for preloading the blade retention stiffening member in a direction transversely of the longitudinal axis of the blade.

A still further object of this invention is to provide a preloading mechanism for the above described stiffening member by means of a resilient or spring type structure. The spring type structure may take the preferred form of a ball bearing assembly which is distorted sufficiently to impart a resilient preloading force on the blade stiffening member and to maintain such force proportional to the loads being imposed upon the blades.

Another object of this invention is to provide a continued preload on the blade stiffening member so that bell-mouthing distortions, which may occur in the blade receiving socket under high centrifugal loads, will not remove the preload. The structure being particularly adaptable to retention systems where the primary blade retention structure comprises a multiple row ball bearing stack assembly as illustrated and described herein.

Figure 1:
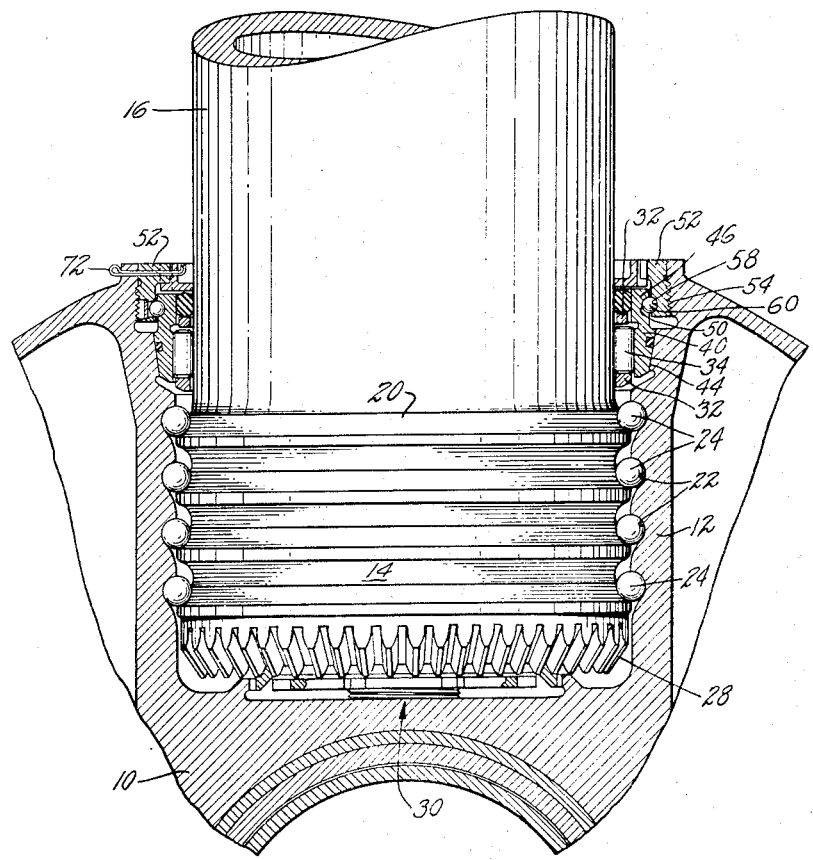

These and other objects of this invention will become readily apparent from the following detailed description of the accompanying drawing in which, Fig. 1 is a partial cross-sectional view of a propeller hub and blade receiving socket including a portion of a propeller blade and the blade retention stiffening structure according to this invention.

Figure 2:
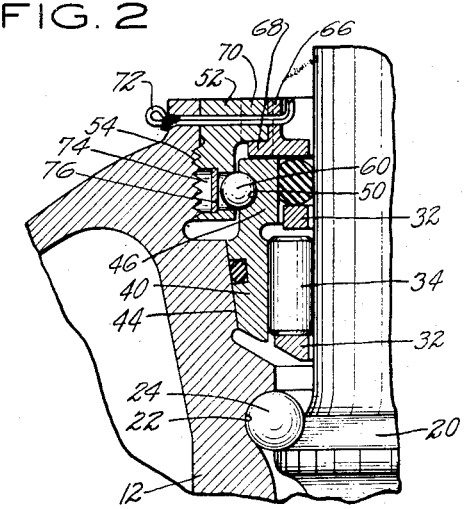

Fig. 2 is a detailed cross-sectional view of the blade retention stiffening structure illustrated in Fig. 1.

Referring to Fig. 1, a portion of a propeller hub 10 is shown having a blade receiving socket 12 in which the shank end 14 of a propeller blade 16 reposes. The shank 14 has a plurality of peripheral grooves 20 which cooperate with a plurality of recessed grooves 22 on the inner periphery of the socket 12 which grooves form inner and outer races, respectively, for the rows of anti-friction ball bearing units 24.

Although not illustrated herein, means are provided for inserting the ball bearing 24 through the walls of the socket 12 to position them between the sets of grooves 20 and 22. The hub construction for permitting the insertion of the balls 24 is more clearly illustrated, for example, in Patent No. 2,462,932 issued March 1, 1949, to John E. Anderson.

An integral gear segment 28 is provided at the inboard end of the blade shank 14 which in turn engages a blade interconnecting gear (not shown) for varying the pitch of all of the propeller blades simultaneously. A jack screw mechanism generally indicated at 30 engages the base of the propeller blade and the hub 10 to provide a means for preloading the ball bearings 24 in an outboard direction so that the blade 16 is positively restrained against centrifugal loads under varied operating conditions. A preferred form of jack screw arrangement is illustrated and described in detail in patent application Serial No. 621,224, filed October 9, 1945, by John E Anderson and Arthur N. Allen, Jr. for Propellers, and which became Patent Number 2,573,783 on November 11, 1951.

Inasmuch as blade vibrations may result in brinelling or fatigue of the retention bearing, a roller bearing is positioned outboard of the ball bearings 24 and comprises a bearing cage 32 and a plurality of roller bearing anti-friction elements 34 which intimately engage the propeller shank 14. The roller bearing assembly illustrated herein is of the straight type as distinguished from tapered roller bearings.

In accordance with this invention a preloading wedge member 40 surrounds roller bearing 34 and forms the outer race for the roller bearing elements. As seen better in Fig. 2, the member 40 has an external tapered surface 44 which engages the blade socket 12 so that movement thereof along the blade longitudinal axis will impose a varying preload on the roller bearing elements 34 in a direction transversely of said longitudinal axis. The wedge ring 40 may be split to permit installation if desired; however, it may be large enough to slide over the base of the blade if made in one piece. The wedge type member 40 carries an upstanding extension 46 which includes an annular groove 50 on the outer periphery thereof. A cooperating preload screw 52 has a threaded connection 54 with the hub or blade socket 12 and circumvents the extension 46 of the wedge member 40. The inner peripheral surface of the screw 52 has an annular groove 58 therein which cooperates with the groove 50 on the extension 46 thereby forming outer and inner races, respectively, for receiving a plurality of anti-friction ball bearing elements 60 therebetween.

The purpose of the ball bearing connection between the wedge member 40 and the preload screw 52 is twofold. First, the bearing elements 60 transmit a preload force on the wedge member 40 in an inboard direction when the screw 52 is screwed down along the threaded connection 54. Secondly, the ball bearing elements 60 serve as a resilient preload connection to continually maintain preloading forces throughout the range of propeller operating conditions wherein the hub or the blade socket 12 may stretch or distort a given amount thereby tending to relieve the preloading forces.

To this end, for example, it has been found that, in utilizing primary blade retention elements such as the ball bearing elements 24 and cooperating races therefore which are integral with the blade shank and the socket 12, the blade socket is subjective to stretching forces and bellmouthing distortion under high centrifugal loads. In order to maintain a positive preload, then, on the roller bearings 34 the preload screw 52 is tightened down to the extent that the ball bearing elements 60 are slightly deformed. The resistance of the individual ball bearing elements 60 to such deformation together with the shape of the associated races then forms a resilient connection between the screw 52 and wedge member 40 so that subsequent distortion of the blade socket 12 will not result in complete relief of the preload forces which are applied via the wedge member 40 to the roller bearing 34 which imparts, in turn, the necessary bending restraint on the propeller blade.

In actual practice then the ball bearing elements 60 are deformed sufficiently so that they never return to their normal shape during propeller operation when the maximum distorting forces are acting on the propeller hub 10 and the socket 12.

A sealing member 66 is provided for closing of the space between the preload screw 52 and the blade 16. In order to provide a firm seating of the sealing member 66 a plurality of peripherally spaced teeth or flanges 68 are provided on the outer periphery of its base. Similar teeth or flanges 70 are provided along the upper internal surface of the screw 52 so that in assembly the teeth 68 on the seal 66 can be slipped through the teeth 70 to a position immediately below the latter. The sealing member 66 is then rotated one tooth space so that the teeth 68 thereon underlie and substantially abut the lower surfaces of the teeth 70 of the screw 52. A cotter pin 72 or other safety locking device is then inserted through the outboard end of the socket 12, the screw 52 and the seal 66 to lock them together.

In order to provide for insertion of the above mentioned ball bearings 60, a passage 74 is provided in the screw 52, which passage is closed off by a suitable plug 76 after loading has been completed.

It is then apparent that as a result of this invention a spring or resilient preloading mechanism has been provided for the blade stiffening anti-friction elements in a propeller blade retention system.

Further, as a result of this invention, a preloading mechanism has been provided for a blade stiffening member of a blade retention construction in which said preload is not relieved by distortions or stretching of the hub during normal operation.

Although only one embodiment of this invention has been illustrated and described herein, it will be apparent that various changes and modifications may be made in the arrangement and construction of the various parts without departing from the scope of this novel concept.

What it is desired to obtain by Letters Patent is:

1. In a blade retention mechanism for a variable pitch propeller including a hub and a blade receiving socket carried by said hub, a blade having one end thereof positioned in said socket, bearing mechanism for restraining said blade against centrifugal loads including cooperating means carried by said blade and socket, means located outboard of said restraining mechanism for resisting bending movements of said blade including members in juxtaposed relation with said socket and blade, means for varying the amount of said resistance including an element adjustable along the longitudinal axis of said blade and a resilient element interposed between said adjustable element and one of said members.

2. In a blade retention mechanism for a variable pitch propeller including a hub and a blade receiving socket carried by said hub, a blade having one end thereof positioned in said socket, cooperating means carried by said blade and socket for restraining said blade against centrifugal loads, and retention means located outboard of said restraining means for restraining said blade against bending loads transversely of the longitudinal axis of said blade comprising anti-friction bearing mechanism surrounding said blade, means for preloading said bearing mechanism transversely of said axis, means for adjusting said preload a predetermined amount and a resilient member between said anti-friction mechanism and said adjusting means.

3. In a blade retention mechanism for a variable pitch propeller including a hub and a blade receiving socket carried by said hub, a blade having one end thereof positioned in said socket, cooperating means carried by said blade and socket for restraining said blade against centrifugal loads, and retention means located outboard of said restraining means for restraining said blade against bending loads transversely of the longitudinal axis of said blade comprising anti-friction bearing mechanism surrounding said blade, means for preloading said bearing mechanism transversely of said axis including a member positioned between said bearing mechanism and said socket, and means for adjusting said preload a predetermined amount having a connection with said socket and including resilient means engaging said member.

4. In a blade retention mechanism for a variable pitch propeller including a hub and a blade receiving socket carried by said hub, a blade having one end thereof positioned in said socket, cooperating means carried by said blade and socket for restraining said blade against centrifugal loads, and retention means located outboard of said restraining means for restraining said blade against bending loads transversely of the longitudinal axis of said blade comprising, anti-friction bearing mechanism surrounding said blade, means for preloading said bearing mechanism transversely of said axis, resilient means for adjusting said preload a predetermined amount including an anti-friction bearing member positioned outboard of said bearing mechanism and engaging said preloading means, and means for deforming said bearing member to resiliently preload the latter in an inboard direction along said axis including an element fixedly adjustable relative to said socket.

5. In a blade retention mechanism for a variable pitch propeller including a hub and a blade receiving socket carried by said hub, a blade having one end thereof positioned in said socket, cooperating means carried by said blade and socket for restraining said blade against centrifugal loads, and retention means located outboard of said restraining means for restraining said blade against bending loads transversely of the longitudinal axis of said blade comprising, anti-friction bearing mechanism surrounding said blade, means for preloading said bearing mechanism transversely of said axis including a member positioned between said bearing mechanism and said socket, said member including an extension depending therefrom along said axis in an outboard direction, means carried by said extension forming an inner bearing race, an outer bearing race surrounding said inner race, anti-friction elements positioned between said races, and means including said outer race for adjusting the amount of preload of said preloading means comprising an adjustable connection with said socket for deforming said elements in an inboard direction.

6. In a variable pitch aircraft propeller having a hub and a blade receiving socket carried by said hub, a blade positioned in said socket, ball bearing means positioned between said socket and blade for retaining said blade in said socket under centrifugal loads whereby said socket is subjected to bell-mouthing distortions during high centrifugal loads, and means for stiffening said blade against bending movements transversely of the longitudinal axis thereof comprising roller bearing means surrounding said blade, said roller bearing means being positioned outboard of said ball bearing means and including a plurality of anti-friction elements engaging said blade, means axially movable along said axis for preloading said roller bearing means transversely of said axis including surfaces engaging said roller bearing and said socket, and adjustable means for imposing a predetermined force on said preloading means including resilient mechanism for maintaining a preload force during said socket distortions.

7. A propeller according to claim 3 wherein the resilient mechanism comprises ball bearing means and a hub engaging member for initially distorting said ball bearing means in an inboard direction.

8. In a variable pitch aircraft propeller having a hub and a blade receiving socket carried by said hub, a blade positioned in said socket, ball bearing means positioned between said socket and blade for retaining said blade in said socket under centrifugal loads whereby said socket is subjected to bell-mouthing distortions during high centrifugal loads, and means for stiffening said blade against bending movements transversely of the longitudinal axis thereof comprising roller bearing means surrounding said blade, said roller bearing means being positioned outboard of said ball bearing means and including a plurality of anti-friction elements engaging said blade, adjustable means for imposing a preload on said roller bearing means comprising an annular wedge surrounding said roller bearing means and having a tapered surface engaging said socket, said wedge forming an outer race for said roller bearing elements, a depending extension on said wedge having an integral bearing race on the outer periphery thereof spaced outboard of said roller bearing means, an inner race member cooperating with said integral race, anti-friction elements positioned between said cooperating race and race member, and means for maintaining a preload during said socket distortion including means providing adjustment along said longitudinal axis between said socket and race member for distorting said anti-friction elements in an inboard direction.

ARTHUR N. ALLEN, Jr.

REFERENCES CITED

The following references are of record in the file of this patent:

UNITED STATES PATENTS

| Number | Name | Date |
|---|---|---|
| 1,801,511 | Lilley | Apr. 21, 1931 |
| 1,970,114 | Wiegand | Aug. 14, 1934 |
| 2,107,785 | Grabarse et al. | Feb. 8, 1938 |
| 2,473,899 | Murphy | June 21, 1949 |
| 2,499,837 | Sheets | Mar. 7, 1950 |